US 9,878,291 B2

(12) United States Patent
Tai et al.

(10) Patent No.: US 9,878,291 B2
(45) Date of Patent: Jan. 30, 2018

(54) $CO_2$ ADSORPTION AND RECOVERY SYSTEM AND METHOD

(71) Applicant: INDUSTRIAL TECHNOLOGY RESEARCH INSTITUTE, Hsinchu (TW)

(72) Inventors: Chin-Chih Tai, Kaohsiung (TW); Yun-Hsin Wang, Kaohsiung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 129 days.

(21) Appl. No.: 14/875,643

(22) Filed: Oct. 5, 2015

(65) Prior Publication Data

US 2016/0166978 A1  Jun. 16, 2016

(30) Foreign Application Priority Data

Dec. 15, 2014  (TW) .............................. 103222187 U
May 19, 2015  (TW) .............................. 104115851 A

(51) Int. Cl.
*B01D 53/22* (2006.01)
*B01D 63/04* (2006.01)
(Continued)

(52) U.S. Cl.
CPC ....... *B01D 63/046* (2013.01); *B01D 53/0423* (2013.01); *B01D 53/0462* (2013.01);
(Continued)

(58) Field of Classification Search
CPC ............ B01D 53/0423; B01D 53/0462; B01D 53/0476; B01D 53/053; B01D 63/02;
(Continued)

(56) References Cited

U.S. PATENT DOCUMENTS 4,711,645 A    12/1987  Kumar
5,470,377 A *  11/1995  Whitlock ............... B01D 53/04
                                                 95/106
(Continued)

FOREIGN PATENT DOCUMENTS

CN    1315563 C      5/2007
CN    101285573 A   10/2008
(Continued)

OTHER PUBLICATIONS

English language machine translation for CN 101721878 A. Retrieved from http://translationportal.epo.org on Apr. 6, 2017.*
(Continued)

*Primary Examiner* — Jason M Greene
(74) *Attorney, Agent, or Firm* — Rabin & Berdo, P.C.

(57) ABSTRACT

A $CO_2$ adsorption and recovery system including an intake unit, a first purification/adsorption/regeneration unit, a second purification/adsorption/regeneration unit, a three-way valve switching unit, a vacuum drawing unit and an exhaust unit is provided. The first and second purification/adsorption/regeneration units have a hollow fiber bundle impurity adsorption column, a hollow fiber bundle $CO_2$ adsorption column and two heating devices. One set of adsorption columns performs purification and adsorption procedures to the inlet gas in a normal or high pressure condition, and the other set of adsorption columns performs desorption and regeneration procedures in a high temperature condition when the adsorption columns are heated by the heating devices. The three-way valve switching unit exchanges the purification and adsorption procedures with the regeneration procedure to the first and second units. The vacuum drawing unit draws $CO_2$ desorbed from the $CO_2$ adsorption columns alternatively. The exhaust unit drains a purified product gas out.

18 Claims, 7 Drawing Sheets

(51) Int. Cl.
*B01D 53/047* (2006.01)
*B01D 53/04* (2006.01)
*B01D 53/053* (2006.01)
*B01D 63/02* (2006.01)

(52) U.S. Cl.
CPC ....... *B01D 53/0476* (2013.01); *B01D 53/053* (2013.01); *B01D 63/02* (2013.01); *B01D 2253/102* (2013.01); *B01D 2253/104* (2013.01); *B01D 2253/116* (2013.01); *B01D 2253/34* (2013.01); *B01D 2257/504* (2013.01); *B01D 2259/40003* (2013.01); *B01D 2259/414* (2013.01); *Y02C 10/08* (2013.01); *Y02C 10/10* (2013.01)

(58) Field of Classification Search
CPC ............ B01D 63/046; B01D 2257/504; B01D 2253/102; B01D 2253/104; B01D 2253/116; B01D 2253/34; B01D 2259/40003; B01D 2259/414
See application file for complete search history.

(56) References Cited

U.S. PATENT DOCUMENTS

| | | | |
|---|---|---|---|
| 5,846,295 A | 12/1998 | Kalbassi et al. | |
| 5,846,595 A | 12/1998 | Sun et al. | |
| 6,086,842 A * | 7/2000 | Kim | B01D 53/04 423/242.1 |
| 6,103,205 A * | 8/2000 | Wojtowicz | B01D 53/04 423/210 |
| 6,226,888 B1 | 5/2001 | Lang | |
| 6,364,936 B1 * | 4/2002 | Rood | B01D 53/0438 95/115 |
| 6,953,498 B2 | 10/2005 | Walker et al. | |
| 8,540,810 B2 * | 9/2013 | Perera | B01D 53/02 502/56 |
| 2010/0251887 A1 | 10/2010 | Jain | |
| 2011/0219950 A1 * | 9/2011 | Rodrigues | B01D 53/0431 95/96 |
| 2013/0298532 A1 * | 11/2013 | Hamad | B01D 53/0462 60/274 |
| 2014/0161699 A1 * | 6/2014 | Applegarth | B01D 53/0476 423/237 |
| 2015/0273390 A1 * | 10/2015 | Yeom | B01D 69/02 96/8 |

FOREIGN PATENT DOCUMENTS

| | | | |
|---|---|---|---|
| CN | 101721878 A | * | 6/2010 |
| CN | 101745288 A | | 6/2010 |
| CN | 102918337 A | | 2/2013 |
| TW | 201204456 A | | 2/2012 |
| TW | M426754 U | | 4/2012 |
| TW | 201424826 A | | 7/2014 |
| TW | 201425669 A | | 7/2014 |

OTHER PUBLICATIONS

Fengsheng Su et al., "CO2 capture from gas stream by zeolite 13X using a dual-column temperature/vacuum swing adsorption†", Aug. 6, 2012.
Peter J.E. Harlick et al., "An experimental adsorbent screening study for CO2 removal from N2", Jul. 27, 2004.
Chin-Chih Tai et al., "Development of Adsorbent Hollow Fibres for Environmental Applications", Jan. 15, 2013.
Niklas Hedin et al., "Adsorbents for the post-combustion capture of CO2 using rapid temperature swing or vacuum swing adsorption", Nov. 15, 2012.
Gang Li et al., "Capture of CO2 from high humidity flue gas by vacuum swing adsorption with zeolite 13X", Dec. 27, 2007.
Taiwanese Office Action dated Apr. 12, 2016.

* cited by examiner

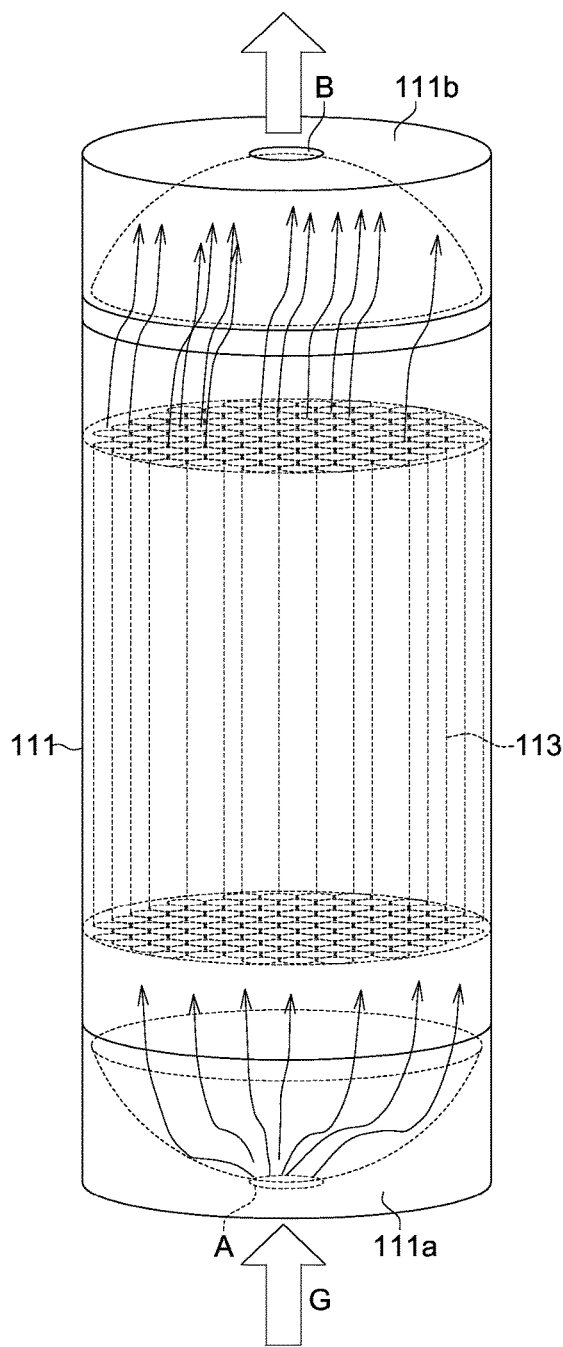 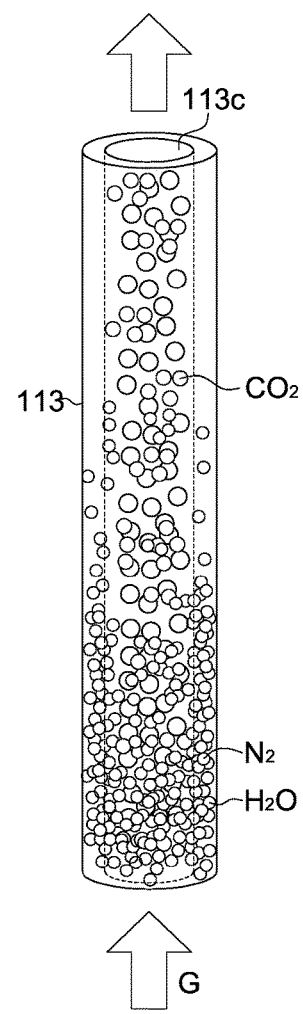
FIG. 1A                          FIG. 1B

CO₂ ADSORPTION AND RECOVERY SYSTEM AND METHOD

This application claims the benefit of Taiwan application Serial No. 103222187, filed Dec. 15, 2014, and the benefit of Taiwan application Serial No. 104115851, filed May 19, 2015, the disclosures of which are incorporated by reference herein in its entirety.

TECHNICAL FIELD

The technical field relates to a $CO_2$ adsorption and recovery system and method.

BACKGROUND

At present, the emission of a large amount of $CO_2$ to the atmosphere not only causes climate change and changes the entire ecological system, but also affects food production and water supply. Nowadays, the whole world has established regulations, taxation and transaction schemes related to the $CO_2$ emission, hoping that the efficiency of renewable energy can be increased, sustainable environment can be achieved, and the $CO_2$ emission by the petrochemical industry can be gradually reduced year by year. Every country is dedicated to the promotion of clean energy and carbon reduction as well as the recycling and recovery of $CO_2$, not only reducing the $CO_2$ emission but further creating more economic value. Therefore, how to recover and purify $CO_2$ more efficiently with unnecessary energy consumption, which occurs during the process of $CO_2$ adsorption, desorption and recovery, has become a prominent task to the industries.

SUMMARY

The disclosure is directed to a $CO_2$ adsorption and recovery system, which captures $CO_2$ and reduces energy loss by repeatedly switching pressure, thermal and vacuum swing processes.

According to one embodiment, a $CO_2$ adsorption and recovery system is provided. The $CO_2$ adsorption and recovery system includes an intake unit, a first purification/adsorption/regeneration unit, a second purification/adsorption/regeneration unit, a three-way valve switching unit, a vacuum drawing unit and an exhaust unit. The first and second purification/adsorption/regeneration units both have a hollow fiber bundle impurity adsorption column, a hollow fiber bundle $CO_2$ adsorption column and two heating devices disposed around respective adsorption column. One set of adsorption columns performs a purification and adsorption procedure to an inlet gas in an atmosphere or high pressure condition, and the other set of adsorption columns performs a desorption and regeneration procedure in a high temperature condition when the other set of adsorption columns are heated by the heating devices thereof. The three-way valve switching unit is used to exchange the purification and adsorption procedure with the desorption procedure to the first and second purification/adsorption/regeneration units. The vacuum drawing unit is used to draw $CO_2$ desorbed from the two $CO_2$ adsorption columns alternatively. The exhaust unit is used to drain a purified product gas out.

According to another embodiment, a $CO_2$ adsorption and recovery method is provided. The method includes following steps. A hollow fiber bundle impurity adsorption column is used to purify an inlet gas so as to adsorb impurities exclusive of $CO_2$ from the inlet gas. A hollow fiber bundle $CO_2$ adsorption column is used to adsorb the $CO_2$ contained in the inlet gas. A desorption and regeneration procedure is performed in a high temperature condition to desorb the $CO_2$ from the $CO_2$ adsorption column.

A detailed description is given in the following embodiments with reference to the accompanying drawings.

BRIEF DESCRIPTION OF THE DRAWINGS

FIGS. 1A and 1B are schematic diagrams of a hollow fiber bundle adsorption column applied in the $CO_2$ adsorption and recovery system of the disclosure and a hollow fiber adsorbent thereof respectively.

DETAILED DESCRIPTION

Figure 2A:
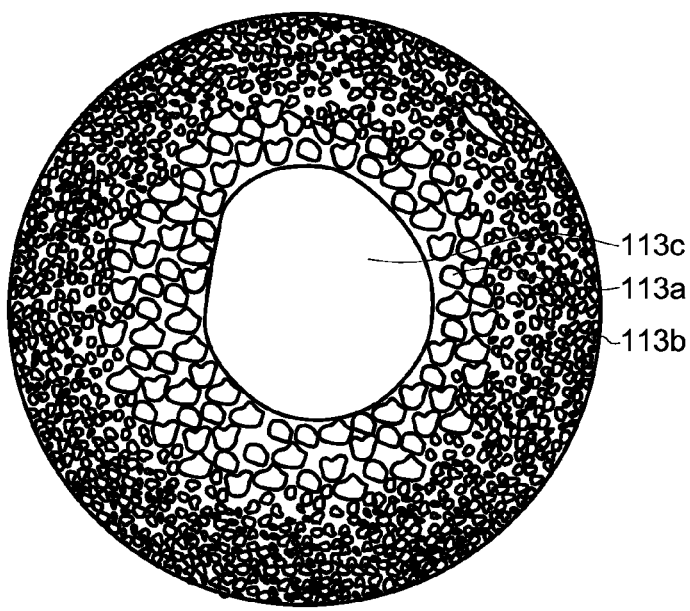
FIG. 2A is an enlargement of a cross section diagram of a hollow fiber adsorbent.

The following description is of the best-contemplated mode of carrying out the disclosure. This description is made for the purpose of illustrating the general principles of the disclosure and should not be taken in a limiting sense. The scope of the disclosure is best determined by reference to the appended claims.

A $CO_2$ adsorption and recovery system is disclosed in an exemplary example of the disclosure. The $CO_2$ adsorption and recovery system uses a heating device to heat up the hollow fiber adsorption material into a high temperature condition, and further desorbs and regenerates the $CO_2$ adsorption column in conjunction with a vacuum drawing process to decrease energy consumption. The conventional pressure swing adsorption (PSA) has a disadvantage of low productivity. Since the operating condition must be maintain at a certain high pressure due to high mass transfer resistance and high pressure drop of the commercial adsorbent pellet, problems such as high energy consumption, high operating cost and adsorption material chalking will occur. When the $CO_2$ adsorption and recovery system of the disclosure performs a regeneration procedure by heating (such as electric heating), the required regeneration temperature and regeneration time both are lower than that of the commercial adsorbent pellet, so that energy consumption and operating cost can be reduced.

In an exemplary example of the disclosure, the commercial adsorbent pellet is replaced with the hollow fiber adsorption material, such that the $CO_2$ adsorption and recovery system of the disclosure can avoid the problems caused by the conventional design, which uses adsorbent pellet to capture $CO_2$, and has significant improvement in terms of $CO_2$ adsorption capacity, $CO_2$ purity of recovery, and requirement of low energy consumption. In the present disclosure, the hollow fiber adsorption material is prepared with polymer instead of inorganic binder, and possesses a coral porous structure and a high specific surface area (between 2500~3500 $m^2/m^3$). The conventional adsorption packed bed column is filled with commercial pellets such as activated carbon, zeolite, amine-modified silicon materials, metal oxides, and hydrotalcite-like talc, and has a low specific surface area (less than 2500 $m^2/m^3$) and a poor adsorption/desorption efficiency. Moreover, the inorganic binder used in commercial adsorbent material deteriorates the adsorption sites of adsorbent and resulted in poor adsorption capacity. Besides, the adsorbent solid-content of the hollow fiber adsorbent can be more than 90%, and the hollow fiber adsorbent maintains high flexibility from polymer. The adsorption site of the hollow fiber adsorbent is not covered by the binder as what will occur to the commercial adsorbent material. In comparison, the hollow fiber adsorbent of the disclosure has very low mass transfer resistance, high adsorption/desorption rate which is more than 2~3 times greater than that of the commercial adsorbent materials (having a spherical, cylindrical or honeycombed shape, for example), and a low pressure drop which is 100 times lower than that of the conventional packed bed column. The hollow fiber adsorbent of the disclosure can quickly achieve desorption and regeneration no matter the operation is conducted by means of pressure swing adsorption (PSA), vacuum swing adsorption (VSA) or thermal swing adsorption (TSA). In comparison to the commercial adsorbent material of packed bed, the equipment size could be reduced due to the use of hollow fiber adsorbent. In addition, it is easy for hollow fiber adsorbent to be packed and operate in adsorption/desorption process, and avoid the pulverization.

Also, the design of the $CO_2$ adsorption and recovery system is based on the hollow fiber adsorbent. Since the hollow fiber has high performance in adsorption/desorption and selectivity, high purity $CO_2$ (purity is more than 90%) can be recovered for the downstream manufacturers to use without having to install any gas purification devices at the rear end. Therefore, relevant processing equipment after recovery can be reduced.

A number of embodiments are disclosed below for elaborating the disclosure. However, the disclosed embodiments are for exemplary and explanatory purpose only, not for limiting the scope of protection of the disclosure.

Referring to FIGS. 1A and 1B, schematic diagrams of a hollow fiber bundle adsorption column 111 applied in the $CO_2$ adsorption and recovery system of the disclosure and a hollow fiber adsorbent 113 thereof are respectively shown. The hollow fiber adsorbent bundle adsorption column 111 includes an gas entrance 111a, an gas outlet 111b and a plurality of hollow fiber adsorbents 113 arranged side by side and disposed between the gas entrance 111a and the gas outlet 111b. The hollow fiber adsorbents 113 can be a porous material prepared by a spinning process. During the spinning process of hollow fiber, the green stock is formed by mixing and blending an organic solvent, such as N-Methyl-2-pyrrolidone (NMP), high polymers such as polysulfone (PSF), and a molecular sieve material, such as 3A, 4A, 5A, 13X, HiSiv1000, HiSiv3000, HiSiv6000, activated alumina, aerogel, and activated carbon, for 1-3 days. Then, the degassed green stock is placed in a stainless pressure tank and left for about 10-30 minutes until no bubbles are contained. Then, the hollow fiber spinning process can be performed to the degassed green stock.

The tube-shaped hollow fiber adsorbent prepared with spinning process can be cropped according to required lengths, and a suitable quantity of tube-shaped hollow fiber adsorbents are bundled and placed into a pressure container (such as an aluminum container) whose shape can be cylindrical, rectangular, or squared. A suitable gap for airflow diffusion is created between the entrance A and the exit B at the top and the bottom of the hollow fiber bundle adsorption column 111 and the hollow fiber material (as indicated in FIG. 1A). Therefore, there is a sufficient buffer region for the inlet gas G (such as fume) to diffuse so that the contact surface of the hollow fiber adsorbents 113 to be uniformly eluted by the inlet gas G.

Moreover, the gap between the front end and the rear end of hollow fiber adsorbents 113 is sealed with thermal resistant silicone, and the gap between the hollow fiber adsorbents 113 and the inside wall of the container can also be sealed with thermal resistant silicone. Therefore, the lumen of hollow fiber is as the only airflow channel without by-pass for increasing adsorption effect. When the inlet gas G (containing a variety of gases such as water vapor, nitrogen, oxygen, sulfide and carbon dioxide) flows through the lumen of hollow fiber adsorbents 113 and moves forwards along the axial direction, due to the highly selectivity of the material, the hollow fiber adsorbents can adsorb all gases exclusive of $CO_2$, and the main flowing direction of the gas and the distribution of impurities (such as $H_2O$ molecules) of the hollow fiber adsorbents 113 are shown in FIG. 1B. Therefore, after the inlet gas G passes through the first purification procedure, there is only $CO_2$ passed. Then, the remaining inlet gas G continues to pass through the following adsorption column. The hollow fiber adsorbents (such as 13X) of the other adsorption column has high selectivity for $CO_2$ to produce a purified product gas.

Figure 2B:
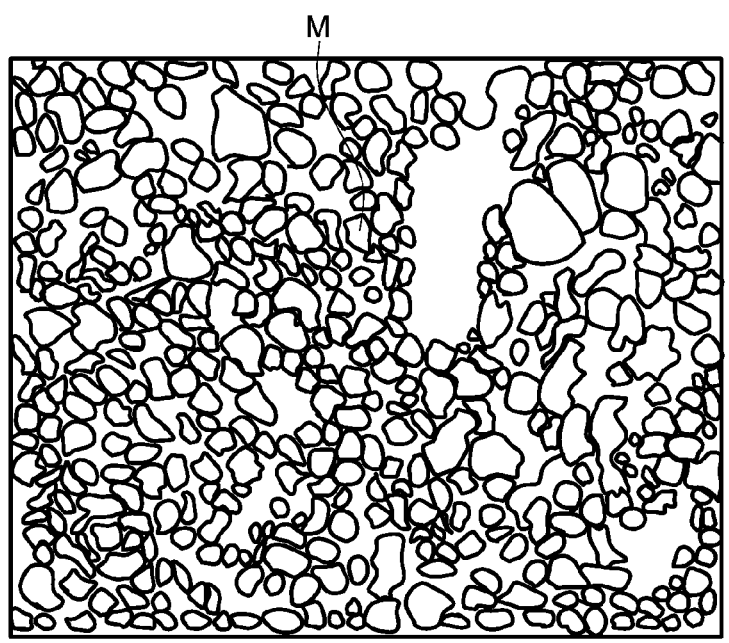
FIG. 2B is an enlargement diagram of an inner layer structure of FIG. 2A.

In an embodiment, the hollow fiber adsorbents 113 can have two or more than two layers structure. Referring to FIG. 2A, an enlargement of a cross section diagram of a hollow fiber adsorbent 113 is shown. The inner layer structure 113a of the hollow fiber adsorbent 113 has a finger-like porous structure, and the outer-layer structure 113b is relatively dense than the inner layer structure 113a, so that the double-layer hollow fiber adsorbent possesses better mechanic strength. Meanwhile, the special finger-like porous structure enables adsorbates to reach at the adsorption sites of the hollow fiber adsorbent easily and enhances adsorption capacity. Moreover, a thermal conductive adsorption material which is less than 5 wt. % could be contained in the hollow fiber adsorbents 113 as well. The thermal or electric conductive adsorption material includes carbon black, graphite, graphene, activated carbon, metal powders, metal oxides (such as copper oxide, iron oxide or BaTiO3 etc.), and conducting polymer (such as polyaniline, PANI). Referring to FIG. 2B, an enlargement diagram of an inner layer structure 113a of FIG. 2A is shown. The distribution of molecular sieve (such as 13X) as shown in FIG. 2B, the molecular sieve powder M is uniformly dispersed in the framework of hollow fiber but not covered by polymers so as to still possess the adsorption characteristics of the powder M.

Figure 3:
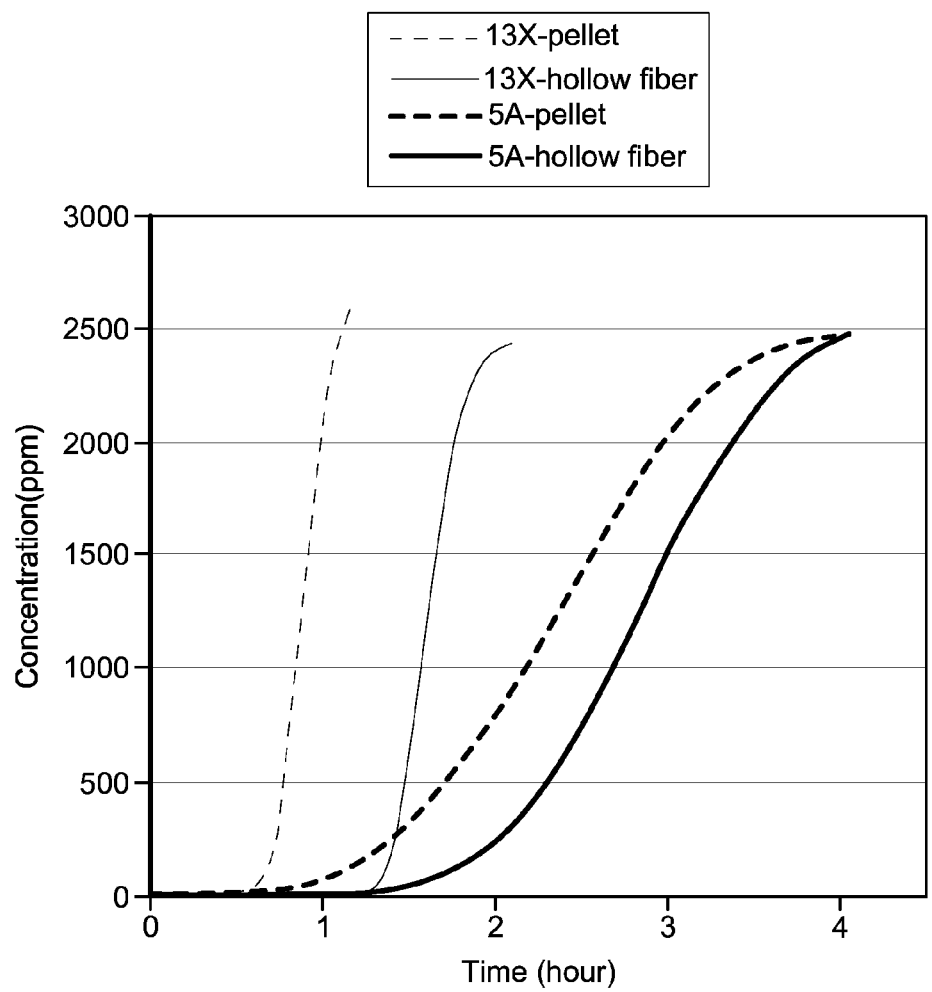
FIG. 3 is a comparison of $CO_2$ adsorption breakthrough curves between hollow fiber adsorbents and commercial pellets.

The hollow fiber adsorbents 113, having low mass transfer resistance, high adsorption capacity, and a steep breakthrough curve within a shorter period of time. Referring to FIG. 3, a comparison of $CO_2$ adsorption curves between hollow fiber adsorbent and commercial pellet is shown. No matter the molecular sieve material is 5A or 13X, the hollow fiber with high specific surface area and porous structure, leads to the high adsorption efficiency The commercial adsorbent pellets having a low specific surface area and a high mass transfer resistance, results in a poor adsorption efficiency, a shorter adsorption time, a lower adsorption uptake and a broader breakthrough curve. In an embodiment, under the operating condition that the hollow fiber adsorbent is 40 g, the $CO_2$ gas concentration is 3000 ppm, and the flow rate is 1 L/min, the $CO_2$ adsorption capacity of the 5A and 13X hollow fiber adsorption columns are 1.41 wt. % and 1.31 wt. %, respectively.

Refer to Table 1. The $CO_2$ adsorption is tested under different $CO_2$ concentrations. When the gas concentration increases, the property with the low mass transfer resistance of hollow fiber becomes more evident. Take the result of $CO_2$ adsorption experiment at 100% $CO_2$ for example. The time to achieve adsorption equilibrium is around 0.33 hour, and the adsorption capacity is increased to about 11 wt. % compared to the capacity of 1.3 wt. % under the condition of 3000 ppm $CO_2$. That is, per gram of adsorption material can adsorb 2.5 millimole of $CO_2$.

TABLE 1

$CO_2$ adsorption amount (concentration control)

| | $CO_2$ concentration | | | |
|---|---|---|---|---|
| | 3000 ppm | 5% | 50% | 100% |
| Adsorption capacity | 1.30 wt. % | 4.37 wt. % | 8.46 wt. % | 10.92 wt. % |
| | 0.461 g | 14.633 g | 28.315 g | 36.581 g |

In addition, under the condition of 100% $CO_2$, parameter adjustment is performed with respect to different flow rates and different adsorption pressures. When the flow rate is between 1 L/min-3 L/min, and the pressure is 0 bar and 1 bar, the adsorption time is inversely proportional to the flow rate. When the flow rate is increased by 3 times, the adsorption time is reduced to be ⅓ of the original adsorption time. Moreover, in a high adsorption pressure condition, $CO_2$ adsorption amount significantly increases. Refer to Table 2. Under the condition that the flow rate is 3 L/min and the pressure is 1 bar, the calculated adsorption capacity is around 24 wt. %. It shows that $CO_2$ molecules to be diffused to the interior of the fiber and be adsorbed under high adsorption pressure condition, so that adsorption efficiency can be effectively increased.

TABLE 2

$CO_2$ adsorption amount (flow rate, pressure conditions)

| | Flow rate, pressure | | | | |
|---|---|---|---|---|---|
| | 1 L/min 0 bar | 2 L/min 0 bar | 2 L/min 1 bar | 3 L/min 0 bar | 3 L/min, 1 bar |
| Adsorption capacity | 10.92 wt. % | 10.87 wt. % | 21.74 wt. % | 13.84 wt. % | 23.87 wt. % |
| | 36.581 g | 36.216 g | 72.433 g | 46.094 g | 79.545 g |

Figure 5A:
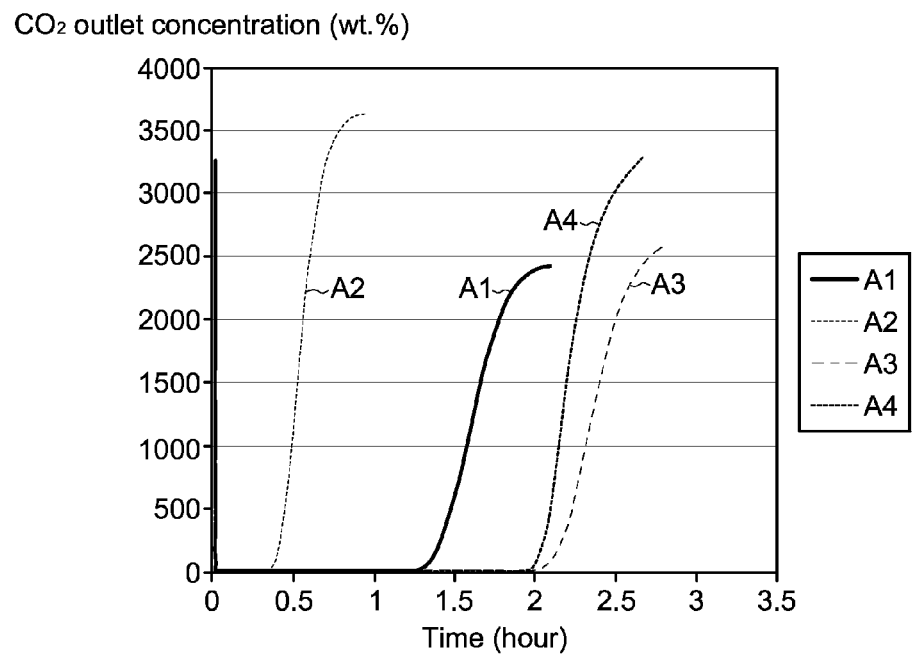
FIG. 5A shows a relationship diagram of outlet concentration vs. adsorption time for the samples A1~A4 of Table 3.

Refer to Table 3. The inlet gas composed of water vapor, nitrogen and $CO_2$ was shown in this experiment. If the impurities especially the water molecules contained in the inlet gas are not adsorbed by pre-treatment, the $CO_2$ adsorption capacity of the hollow fiber adsorbent will be negatively affected. Let the $CO_2$ gas concentration of 3000 ppm be taken for example. With respect to the inlet gas not dried by pre-treatment, the adsorption time and adsorption capacity of the hollow fiber adsorbent for $CO_2$ are 1.38 hours and 1.3 wt. %, respectively. When humidity of inlet gas is 80% RH, the adsorption capacity of the hollow fiber adsorbent for $CO_2$ decreases to 0.93 wt. %. It shows that the $CO_2$ adsorption efficiency does be affected in the presence of water. Therefore, in the present system, an impurity adsorption unit (such as the hollow fiber adsorbent containing 3A or 4A molecular sieve) is used in pre-treatment to remove impurities and water molecules from the inlet gas. The experiment result shows that the adsorption capacity of the hollow fiber adsorbents for $CO_2$ at the rear end can increase to be above 2.0 wt. %. Besides, FIG. 5A shows a relationship diagram of outlet concentration vs. adsorption time for the hollow fiber adsorbents A1-A4 in Table 3.

TABLE 3

Comparison of $CO_2$ adsorption capacity

| Reference numeral | Inlet gas | Pre-treatment | Adsorption time (hr) | Adsorption caapcity |
|---|---|---|---|---|
| A1 | $CO_2 + N_2$ | No | 1.38 | 1.30 wt. % |
| A2 | $CO_2 + N_2 + H_2O$ | No | 0.42 | 0.93 wt. % |
| A3 | $CO_2 + N_2 + H_2O$ | Yes, 3A | 2.1 | 2.05 wt. % |
| A4 | $CO_2 + N_2 + H_2O$ | Yes, 4A | 2.05 | 2.00 wt. % |

Figure 5B:
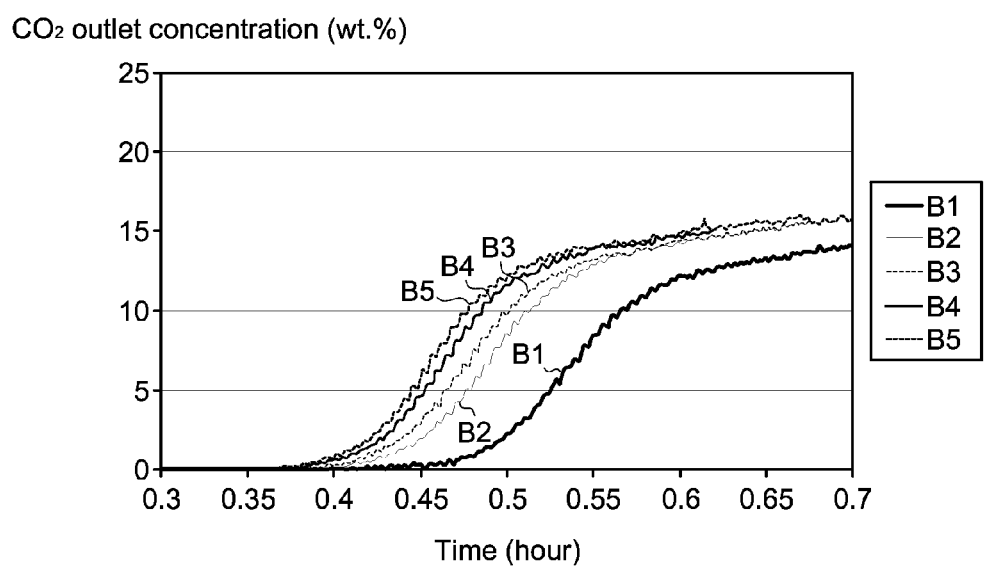
FIG. 5B shows a relationship diagram of outlet concentration vs. adsorption time for the samples B1~B5 of Table 4.

Refer to Table 4. The comparison between conventional thermal swing adsorption (TSA) and the vacuum thermal swing adsorption (VTSA) of the present system is based on the high adsorption/desorption performance of the hollow fiber adsorbent. When the $CO_2$ gas is desorbed by using the conventional thermal swing adsorption with purging gas at high temperature condition (such as 185° C.), it takes more than 15 hours for completing a regenerated procedure. When the $CO_2$ gas is desorbed by using the vacuum thermal swing adsorption under the same desorption temperature, it takes only 1 minute of drawing time for hollow fiber adsorbent to achieve 87% of regeneration recovery. Therefore, regeneration time and energy consumption can both be greatly reduced. Besides, FIG. 5B shows a relationship diagram of outlet concentration vs. adsorption time for the hollow fiber adsorbents B1 to B5 and the results is given in Table 4.

TABLE 4

Comparison of $CO_2$ desorption conditions

| Reference numeral | B1 | B2 | B3 | B4 | B5 |
|---|---|---|---|---|---|
| Desorption condition | TSA (185° C., 15 hr) | VTSA (185° C., 60 min) | VTSA (185° C., 15 min) | VTSA (185° C., 5 min) | VTSA (185° C., 1 min) |
| Desorption amount (wt. %) | 0.69 | 0.63 | 0.61 | 0.60 | 0.60 |

Figure 5C:
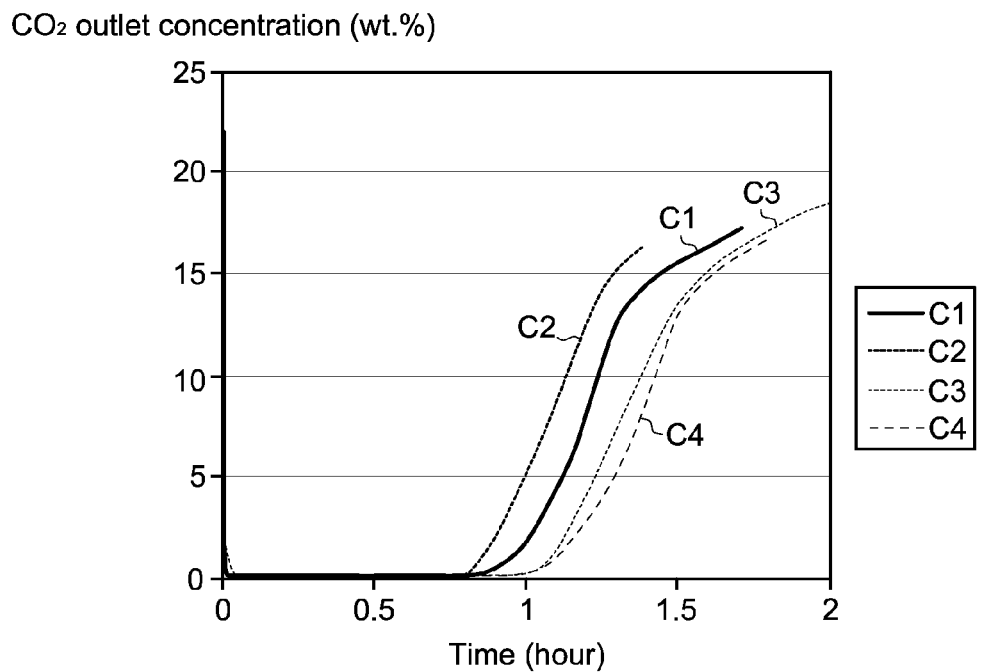
FIG. 5C shows a relationship diagram of outlet concentration vs. adsorption time for the samples C1~C4 of Table 5.

Refer to Table 5. The comparison of recovery and the recovery purity is based on the experiment results of Tables 3 and 4. Different inlet gases (dry gas vs. wet gas) are tested with hollow fiber adsorbents C1-C4. During the desorption procedure by VTSA process, the desorbed $CO_2$ gas is drawn to the gas storage tank by the vacuum drawing unit, and the recovery and recovery purity of the $CO_2$ gas drawn to the gas storage tank are obtained through analysis. Table 5 shows that water not only affects the adsorption capacity of the hollow fiber adsorbent for $CO_2$, but also makes the purity of the recovered $CO_2$ reduce from 98% to 93%. If pre-treatment is performed to remove impurities and water molecules from the inlet gas in advance, the $CO_2$ recovery purity will increase from 93% to 97-98%. Therefore, the impurity adsorption unit used in the pre-treatment of the present system makes the effort on $CO_2$ adsorption efficiency, and at the same time maintains high $CO_2$ recovery purity, which is good to the following CO2 utilization process. FIG. 5C shows a relationship diagram of outlet concentration vs. adsorption time for the hollow fiber adsorbents C1-C4 in Table 5.

TABLE 5

Comparison of $CO_2$ recovery purity

| Reference numeral | C1 | C2 | C3 | C4 |
|---|---|---|---|---|
| Adsorption material | 13X | 13X | 13X + 3A | 13X + 4A |
| Inlet gas | $CO_2$ + $N_2$ | $CO_2$ + $N_2$ + $H_2O$ | $CO_2$ + $N_2$ + $H_2O$ | $CO_2$ + $N_2$ + $H_2O$ |
| Pre-treatment | No | No | Yes, 3A | Yes, 4A |
| Breakthrough time (hr) | 1.0 | 0.9 | 1.13 | 1.16 |
| Adsorption capacity (wt. %) | 6.55 | 5.90 | 7.4 | 7.6 |
| Recovery | 86% | 85% | 85% | 85% |
| Recovery purity | 98% | 93% | 97% | 98% |

Refer to Table 6. When the system only includes a $CO_2$ adsorption material (13X) with 20% of dry $CO_2$ gas feeding, the $CO_2$ adsorption capacity is 7.53 wt. %. However, if the inlet gas contains high humidity water vapor (100% RH) and a small amount of volatile organic compounds (VOCs, and here, butane is used as a representative gas), it is evident that the $CO_2$ adsorption amount is reduced to about 6.34 wt. %, and the recovery and the recovery purity reduce to 82% and 89%, respectively.

Figure 5D:
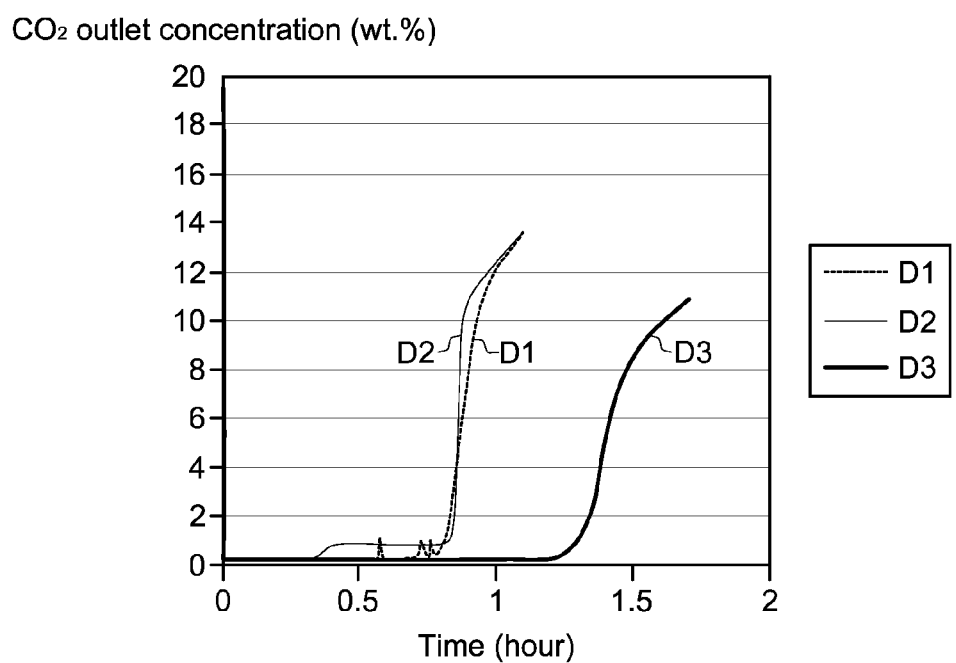
FIG. 5D shows a relationship diagram of outlet concentration vs. adsorption time for the samples D1~D3 of Table 6.

Through hollow fiber spinning technology and formulation adjustment, a multi-function and multi-layer hollow fiber adsorbent is manufactured. AS result, several gas components could be treated with one hollow fiber module at the same time. In comparison to the pre-treatment of the conventional $CO_2$ capturing device which must be combined several batches processing, the disclosure is capable of saving processing time and reducing equipment size and at the same time achieving excellent $CO_2$ capture efficiency. With the inlet gas composed of 20% of $CO_2$, high humidity water vapor, and VOCs, the $CO_2$ capacity, recovery and recovery purity could be increased in the presence of pre-treatment device. The $CO_2$ recovery and recovery purity can be increased to 85% and 97%, respectively. FIG. 5D shows a relationship diagram of outlet concentration vs. adsorption time for the hollow fiber adsorbents D1-D3 in Table 6.

TABLE 6

Comparison of $CO_2$ recovery purity

| Reference numeral | D1 | D2 | D3 |
|---|---|---|---|
| Adsorption material | 13X | 13X | 13X + pre-treatment material (4A&HiSiv3000) |
| inlet gas | 20% of $CO_2$ | 20% of $CO_2$ + $H_2O$ + 500 ppm butane | 20% of $CO_2$ + $H_2O$ + 500 ppm butane |

TABLE 6-continued

Comparison of $CO_2$ recovery purity

| Reference numeral | D1 | D2 | D3 |
|---|---|---|---|
| Operating condition | 1 L/min, normal pressure | 1 L/min, normal pressure | 1 L/min, normal pressure |
| Adsorption capacity (wt. %) | 7.53 | 6.34 | 11.8 |
| Recovery | 86% | 82% | 85% |
| Recovery purity | 97% | 89% | 97% |

Figure 5E:
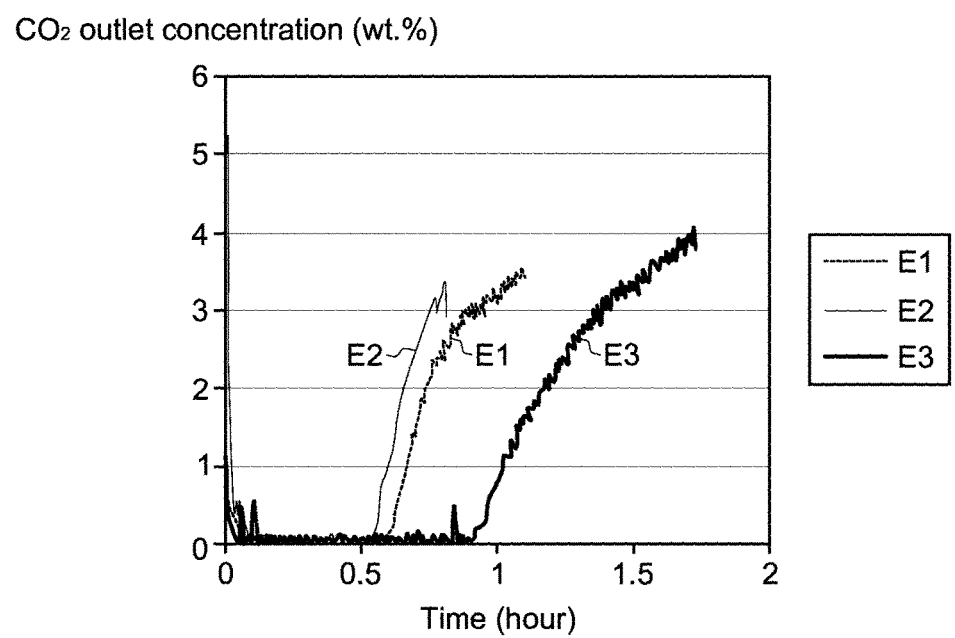
FIG. 5E shows a relationship diagram of outlet concentration vs. adsorption time for the samples E1~E3 of Table 7.

Refer to Table 7. In the present experiment, the $CO_2$ intake concentration is 5%, and the gas flow rate is increased to 10 L/min. The 13X hollow adsorption material is also used in the $CO_2$ adsorption and recovery system. Under the operating pressure of 2 bar, the adsorption capacity is 5.54 wt. %, and the recovery and the recovery purity are 85% and 96%, respectively. When the intake includes water vapor and a small amount of butane, both the adsorption capacity and the recovery purity are decreased. It shows the two gas components, that is, water vapor and butane, affect the capture efficiency of the $CO_2$ adsorption and recovery system. In the presence of the pre-treatment system, the disclosure provides an effective solution to increase the $CO_2$ adsorption capacity, the recovery and the recovery purity. Besides, FIG. 5E shows a relationship diagram of outlet concentration vs. adsorption time for the hollow fiber adsorbents E1-E3 of Table 7.

TABLE 7

| Reference numeral | E1 | E2 | E3 |
|---|---|---|---|
| Adsorption material | 13X | 13X | 13X + pre-treatment material (4A&HiSiv3000) |
| Inlet gas | 5% $CO_2$ | 5% $CO_2$ + $H_2O$ + 50 ppm butane | 5% $CO_2$ + $H_2O$ + 50 ppm butane |
| Operating condition | 10 L/min, 2 bar | 10 L/min, 2 bar | 10 L/min, 2 bar |
| Adsorption capacity (wt. %) | 5.54 | 5.03 | 8.8 |
| Recovery | 85% | 85% | 84% |
| Recovery purity | 96% | 80% | 93% |

Figure 4:
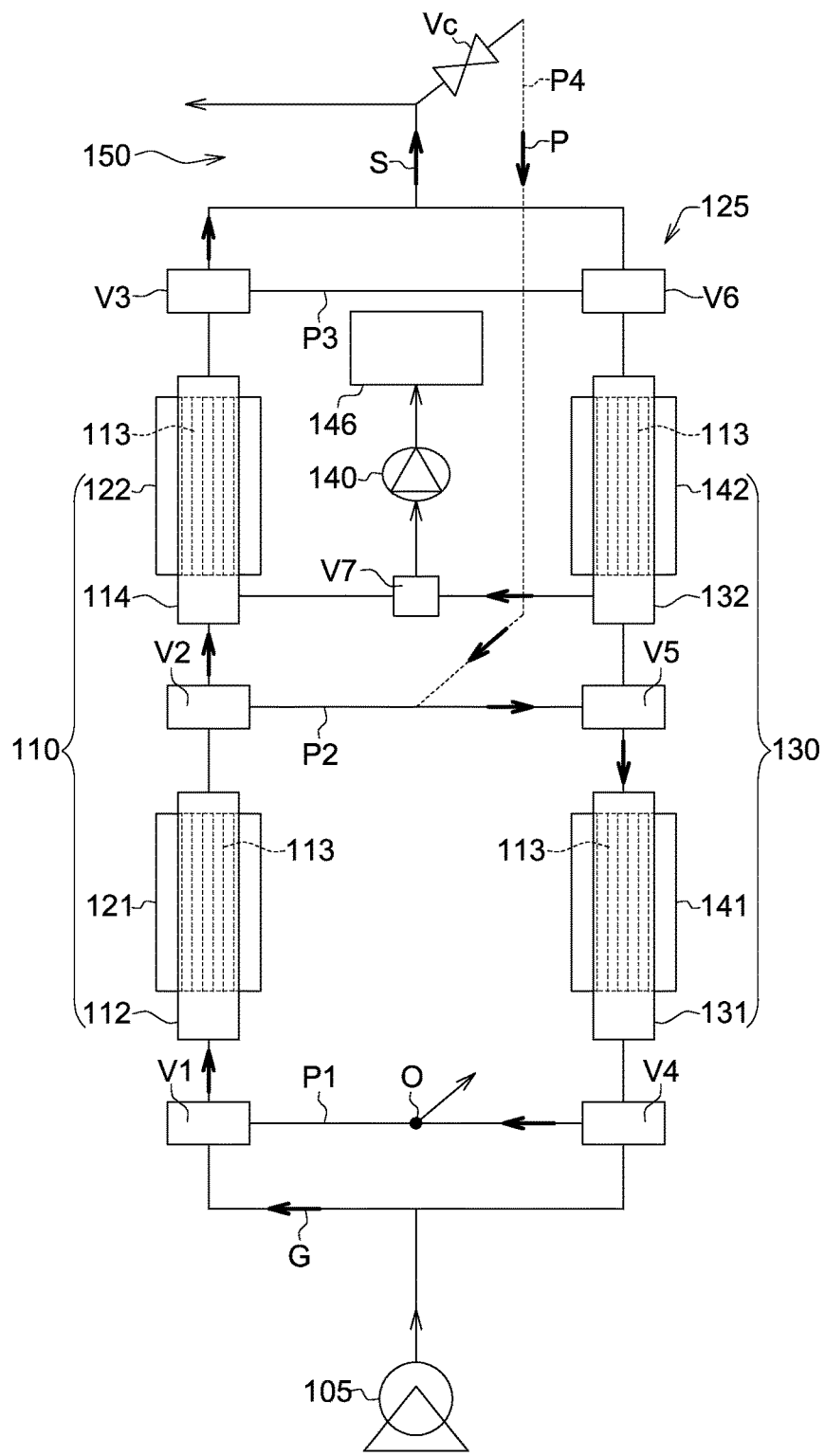
FIG. 4 is a $CO_2$ adsorption and recovery system according to an embodiment of the disclosure.

Referring to FIG. 4, a $CO_2$ adsorption and recovery system 100 according to an embodiment of the disclosure is shown. The $CO_2$ adsorption and recovery system 100 includes an intake unit 105, a first purification/adsorption/regeneration unit 110, a second purification/adsorption/regeneration unit 130, a three-way valve switching unit 125, a vacuum drawing unit 140 and an exhaust unit 150. The intake unit 105 provides an inlet gas G. The first purification/adsorption/regeneration unit 110 has a hollow fiber bundle impurity adsorption column 112, a hollow fiber bundle $CO_2$ adsorption column 114 and two heating devices 121 and 122 disposed around respective adsorption column 112 or 114. The second purification/adsorption/regeneration unit 130 has the other hollow fiber bundle impurity adsorption column 131, the other hollow fiber bundle $CO_2$ adsorption column 132 and the other two heating devices 141 and 142 disposed around respective adsorption column 131 or 132. One set of hollow fiber bundle impurity and $CO_2$ adsorption columns 112 and 114 performs a purification and adsorption procedure to the inlet gas G in a normal or high pressure condition. The other set of the hollow fiber bundle impurity adsorption column and $CO_2$ adsorption columns 131 and 132 performs desorption and regeneration procedures in a high temperature condition when the adsorption columns 131 and 132 are heated by the heating devices 141 and 142 thereof. The three-way valve switching unit 125 is used to exchange the purification and adsorption procedure with the desorption procedure to the first purification/adsorption/regeneration unit 110 and the second purification/adsorption/regeneration unit 130. The vacuum drawing unit 140 is connected to the two hollow fiber bundle $CO_2$ adsorption columns 114 and 132 for drawing the desorbed $CO_2$. The exhaust unit 150 drains the purified gas product S out.

Structure of the hollow fiber bundle impurity adsorption column and the hollow fiber bundle $CO_2$ adsorption column is disclosed with reference to the description of the hollow fiber bundle adsorption column 111 of FIGS. 1A and 1B. The hollow fiber bundle adsorption column 111 has a plurality of axial hollow fiber adsorbents 113 arranged side by side in the shape of columns. The inlet gas G passes through the hollow fiber adsorbents 113 along the axial direction of the bore 113c of the hollow fiber adsorbents 113.

To put it in greater details, the intake unit 105 of the present system may include an air compressor or a blower. The inlet gas G drawn by the intake unit 105 flows into one of the hollow fiber bundle impurity adsorption columns 112 or 131, and the hollow fiber adsorption material of the hollow fiber bundle impurity adsorption column adsorbs or filters gases exclusive of $CO_2$ from the inlet gas G in advance and allows only preferential adsorption of the desired gas (such as $CO_2$) to pass through, such that the inlet gas G can be purified. Gases exclusive of $CO_2$ are such as water vapor, volatile organic gas, nitrogen oxides, sulfur oxides, nitrogen or oxygen. In an embodiment, the adsorption material of the hollow fiber bundle impurity adsorption columns 112 and 131 has little or no adsorption capacity for $CO_2$, and can adsorb gases exclusive of $CO_2$.

Besides, the adsorption material of the hollow fiber bundle $CO_2$ adsorption columns 114 and 132 has high CO2 selectivity, and shows $CO_2$ adsorption behavior in a normal or high pressure condition. When the adsorption procedure reaches the breakthrough point, the heating devices can be used in conjunction with a vacuum drawing process in a high temperature condition such that the desorption/regeneration procedure can be performed. Therefore, $CO_2$ can be drawn and desorbed by the vacuum drawing unit 140, and further stored in the gas storage tank 146 for recovery or recycling purpose.

The heating devices adopted in the present system can be an optional (such as heating belts, heating packs or heating pads). The desorption temperature is monitored by a thermocouple which further sends back the signal to a controller which accurately controls the pre-determined heating temperature (such as 150~200° C.) and avoids unnecessary energy consumption. As indicated in FIG. 4, two heating devices 121 and 122 and the other two heating devices 141 and 142 are used alternately. That is, when the first purification/adsorption/regeneration unit 110 performs desorption and regeneration procedures, the hollow fiber bundle impurity adsorption column 112 and the hollow fiber bundle $CO_2$ adsorption column 114 respectively are heated by the heating devices 121 and 122 disposed around the first purification/adsorption/regeneration unit 110. When the first purification/adsorption/regeneration unit 110 performs purification and adsorption procedures, the first purification/adsorption/regeneration unit 110 is not heated by the heating devices 121 and 122 disposed in the surrounding thereof, and hence maintains in a room temperature condition. Likewise, when the second purification/adsorption/regeneration unit 130 performs a desorption and regeneration procedure, the hollow fiber bundle impurity adsorption column 131 and the hollow fiber bundle $CO_2$ adsorption column 132 are respectively heated by the heating devices 141 and 142 disposed around the second purification/adsorption/regeneration unit 130. When the second purification/adsorption/regeneration unit 130 performs purification and adsorption procedures, the second purification/adsorption/regeneration unit 130 is not heated by the heating devices 141 and 142 disposed in the surrounding thereof, and hence maintains in a room temperature condition.

The two hollow fiber bundle impurity adsorption columns 112 and 131 and the two hollow fiber bundle $CO_2$ adsorption columns 114 and 132 can be separated by an insulating material (not illustrated) to avoid the temperature of hollow fiber bundle adsorption columns influencing by the radiant heat from the hollow fiber bundle impurity adsorption columns. Moreover, when one set of hollow fiber bundle adsorption columns need to cool down, a fans can be used for heat convection that draw the external cold air in and take the hot air away. Therefore, the cooling time can be decreased.

Refer to FIG. 4, the present system uses two sets of hollow fiber bundle adsorption columns to perform different procedures at the same time, and uses the three-way valve switching unit 125 to alternatively switch the two sets of hollow fiber bundle adsorption columns, so that the purification of the inlet gas G and the adsorption of $CO_2$ can be continuously performed. As indicated in airflow direction of FIG. 4, the inlet gas G enters one of the hollow fiber bundle impurity adsorption column 112 in an upward direction to perform a purification procedure, and then enters a hollow fiber bundle $CO_2$ adsorption column 114 to perform an adsorption procedure. Of the product gas S drained by the regenerative elution airflow P via the exit port, a small amount of airflow (about 5%) is diverted to the regeneration port. The regenerative elution airflow P enters the other hollow fiber bundle impurity adsorption column 131 in a downward direction to perform desorption and regeneration procedures.

Refer to FIG. 4. The three-way valve switching unit 125 of the present system includes a first solenoid valve V1, a second solenoid valve V2 and a third solenoid valve V3 sequentially disposed in the channel of the first purification/adsorption/regeneration unit 110, a fourth solenoid valve V4, a fifth solenoid valve V5 and a sixth solenoid valve V6 sequentially disposed in the channel of the second purification/adsorption/regeneration unit 130, a first pipe P1 connected between the first solenoid valve V1 and the fourth solenoid valve V4, a second pipe P2 connected between the second solenoid valve V2 and the fifth solenoid valve V5, a third pipe P3 connected between the third solenoid valve V3 and the sixth solenoid valve V6, a seventh solenoid valve V7 three-way connected among the two hollow fiber bundle $CO_2$ adsorption columns 114 and 132 and the vacuum drawing unit 140, and a diverter valve Vc disposed on a regenerative elution pipe P4. The regenerative elution pipe P4 is connected between the second pipe P2 and the exhaust unit 150.

The first solenoid valve V1 is three-way connected among the intake unit 105, the first pipe P1 and the hollow fiber bundle impurity adsorption column 112. The fourth solenoid valve V4 is three-way connected among the intake unit 105, the first pipe P1 and the other hollow fiber bundle impurity adsorption column 131. Moreover, the second solenoid valve V2 is three-way connected among the hollow fiber bundle impurity adsorption column 112, the second pipe P2 and the hollow fiber bundle $CO_2$ adsorption column 114. The fifth solenoid valve V5 is three-way connected among the other hollow fiber bundle impurity adsorption column 131, the second pipe P2 and the other hollow fiber bundle $CO_2$ adsorption column 132. Moreover, the third solenoid valve V3 is three-way connected among the exhaust unit 150, the third pipe P3 and the hollow fiber bundle $CO_2$ adsorption column 114. The sixth solenoid valve V6 is three-way connected among the exhaust unit 150, the third pipe P3 and the other hollow fiber bundle $CO_2$ adsorption column 132.

As indicated in the airflow direction of FIG. 4, the inlet gas G enters the system via the intake unit 105, and then flows to a hollow fiber bundle impurity adsorption column 112 at the left hand side via the first solenoid valve V1. Meanwhile, the gases exclusive of $CO_2$ are adsorbed by the hollow fiber adsorbent, and only the $CO_2$ gas can pass through the second solenoid valve V2 and flow to the hollow fiber bundle $CO_2$ adsorption column 114 at the left hand side. Lastly, a product gas S (purified gas) is drained via the exhaust unit 150. A part of the product gas S enters the regenerative elution pipe P4 via the diverter valve Vc, and further flows to the hollow fiber bundle impurity adsorption column 131 at the right hand side via the fifth solenoid valve V5 to perform a regenerative elution process, so that the elution airflow P containing impurities can be drained to the exhaust exit O via the fourth solenoid valve V4. Besides, for CO2 recovery, the vacuum drawing unit 140 can be used to draw the $CO_2$, which is desorbed from the hollow fiber bundle $CO_2$ adsorption column 132 at the right-hand side, such that the desorbed $CO_2$ enters the gas storage tank 146 via the seventh solenoid valve V7.

As indicated in the above explanation, when the two hollow fiber bundle adsorption columns at the left hand side perform the purification and adsorption procedures, the two hollow fiber bundle adsorption columns perform the desorption/regeneration procedures. Conversely, the three-way solenoid valve is switched to perform a reverse operation, the flow direction is opposite and symmetric to the above fluid direction.

In the above embodiments, the purification and adsorption procedures have an operating temperature lower than about 60° C., and an operating pressure about 1-10 bar. During the impurity desorption procedure, the elution time is about 20 minutes. During the $CO_2$ desorption procedure, $CO_2$ is desorbed and recovered by using vacuum thermal swing adsorption (VTSA) with a vacuum drawing process in a high temperature condition. The $CO_2$ desorption procedure has an operating temperature about 150-200° C. and a heating time about 10-30 minutes. After the temperature of the hollow fiber bundle $CO_2$ adsorption column reaches the required desorption temperature, the vacuum drawing unit 140 is immediately activated to draw the gas for about 1-5 minutes and collect the recovered $CO_2$ to the gas storage tank 146. Then, the recovery and gas purity of the recovered $CO_2$ are analyzed. The analysis shows that the recovery that can be achieved by the present system using the hollow fiber adsorbent is more than 85%, and the $CO_2$ purity is higher than 90%. The long-term stability test of $CO_2$ recovery is also examined under the same operating conditions, and the efficiency is in a stable state. This verifies that the hollow fiber adsorbent used in the $CO_2$ adsorption and recovery system has high reproducibility.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A $CO_2$ adsorption and recovery system, comprising:
an intake unit for providing an inlet gas;
a first purification/adsorption/regeneration unit having one hollow fiber bundle impurity adsorption column connected to the intake unit, one hollow fiber bundle $CO_2$ adsorption column connected to the one hollow fiber bundle impurity adsorption column, and two heating devices, the two heating devices including a first heating device disposed around the one impurity adsorption column and a second heating device disposed around the one $CO_2$ adsorption column;
a second purification/adsorption/regeneration unit having an other hollow fiber bundle impurity adsorption column connected to the intake unit, an other hollow fiber bundle $CO_2$ adsorption column connected to the other hollow fiber bundle impurity adsorption column, and an other two heating devices, the other two heating devices including a third heating device disposed around the other impurity adsorption column and a fourth heating device disposed around the other $CO_2$ adsorption column, wherein one set of the hollow fiber bundle impurity and $CO_2$ adsorption columns performs purification and adsorption procedures to the inlet gas in a normal or high pressure condition, and an other set of hollow fiber bundle impurity and $CO_2$ adsorption columns performs desorption and regeneration procedures using a purified product gas generated after finishing the purification and adsorption procedures as an elution airflow in a high temperature condition when the other set of adsorption columns is heated by the other two heating devices;
a three-way valve switching unit used to exchange the purification and adsorption procedures with the desorption and regeneration procedures to the first and second purification/adsorption/regeneration units;
a vacuum drawing unit connected between the one and the other hollow fiber bundle $CO_2$ adsorption columns for drawing $CO_2$ desorbed from the one and the other hollow fiber bundle $CO_2$ adsorption columns alternatively; and
an exhaust unit used to drain the purified product gas out.

2. The $CO_2$ adsorption and recovery system according to claim 1, wherein a variety of gases adsorbed by the one and the other hollow fiber bundle impurity adsorption columns does not contain $CO_2$.

3. The $CO_2$ adsorption and recovery system according to claim 1, wherein the adsorption material used in the one and the other hollow fiber bundle $CO_2$ adsorption columns has high selective adsorption capacity for $CO_2$.

4. The $CO_2$ adsorption and recovery system according to claim 1, wherein each of the one and the other hollow fiber bundle impurity adsorption columns and the one and the other hollow fiber bundle $CO_2$ adsorption columns has a plurality of axial hollow fiber adsorbents arranged side by side in the shape of columns and disposed therein, and the inlet gas passes through the hollow fiber adsorbents via an axial direction of the bore of the hollow fiber adsorbents.

5. The $CO_2$ adsorption and recovery system according to claim 4, wherein the hollow fiber adsorbents have a specific surface area between 2500~3500 $m^2/m^3$.

6. The $CO_2$ adsorption and recovery system according to claim 4, wherein the hollow fiber adsorbents have a double layer or a multi-layer structure.

7. The $CO_2$ adsorption and recovery system according to claim 4, wherein the hollow fiber adsorbents comprise a thermally conductive adsorption material.

8. The $CO_2$ adsorption and recovery system according to claim 1, wherein when the desorption and regeneration procedures are performed, the vacuum drawing unit is activated.

9. The $CO_2$ adsorption and recovery system according to claim 1, further comprising a gas storage tank used to store the desorbed $CO_2$.

10. The $CO_2$ adsorption and recovery system according to claim 1, wherein the purification and adsorption procedures have an operating temperature lower than 60° C., and an operating pressure between 1-10 bar.

11. The $CO_2$ adsorption and recovery system according to claim 1, wherein the desorption and regeneration procedures have an operating temperature between 150-200° C.

12. The $CO_2$ adsorption and recovery system according to claim 1, wherein the three-way valve switching unit comprises:
  a first solenoid valve, a second solenoid valve and a third solenoid valve, sequentially disposed in a channel of the first purification/adsorption/regeneration unit;
  a fourth solenoid valve, a fifth solenoid valve and a sixth solenoid valve, sequentially disposed in a channel of the second purification/adsorption/regeneration unit;
  a first pipe connected between the first solenoid valve and the fourth solenoid valve;
  a second pipe connected between the second solenoid valve and the fifth solenoid valve;
  a third pipe connected between the third solenoid valve and the sixth solenoid valve;
  a seventh solenoid valve three-way connected among the one and the other hollow fiber bundle $CO_2$ adsorption columns and the vacuum drawing unit; and
  a diverter valve disposed on a regenerative elution pipe, wherein the regenerative elution pipe is connected between the second pipe and the exhaust unit;
  wherein the first solenoid valve is three-way connected among the intake unit, the first pipe and the hollow fiber bundle impurity adsorption column; the fourth solenoid valve is three-way connected among the intake unit, the first pipe and the other hollow fiber bundle impurity adsorption column;
  the second solenoid valve is three-way connected among the hollow fiber bundle impurity adsorption column, the second pipe and the hollow fiber bundle $CO_2$ adsorption column; the fifth solenoid valve is three-way connected among the other hollow fiber bundle impurity adsorption column, the second pipe and the other hollow fiber bundle $CO_2$ adsorption column;
  the third solenoid valve is three-way connected among the exhaust unit, the third pipe and the hollow fiber bundle $CO_2$ adsorption column; the sixth solenoid valve is three-way connected among the exhaust unit, the third pipe and the other hollow fiber bundle $CO_2$ adsorption column.

13. The $CO_2$ adsorption and recovery system according to claim 12, wherein a part of the product gas is diverted by the diverter valve to perform regenerative elution.

14. A $CO_2$ adsorption and recovery method, comprising:
  using a one hollow fiber bundle impurity adsorption column to purify an inlet gas so as to adsorb impurities exclusive of $CO_2$ from the inlet gas;
  using a one hollow fiber bundle $CO_2$ adsorption column to perform an adsorption procedure to the purified inlet gas to adsorb the $CO_2$ contained in the inlet gas; and
  performing a desorption and regeneration procedure using a purified product gas generated after finishing the purification and adsorption procedures as an elution airflow in a high temperature condition to desorb the $CO_2$ from the one hollow fiber bundle $CO_2$ adsorption column.

15. The $CO_2$ adsorption and recovery method according to claim 14, wherein the desorption procedure is performed in conjunction with a vacuum drawing process in a high temperature condition.

16. The $CO_2$ adsorption and recovery method according to claim 15, wherein in the high temperature condition, the desorption procedure has an operating temperature between 150-200° C., a heating time between 10-30 minutes, and a vacuum drawing time is between 1-5 minutes.

17. The $CO_2$ adsorption and recovery method according to claim 14, further comprising:
  alternating the other hollow fiber bundle impurity adsorption column and an other hollow fiber bundle $CO_2$ adsorption column with the one hollow fiber bundle impurity adsorption column and the one hollow fiber bundle $CO_2$ adsorption column to exchange the purification and adsorption procedures with the desorption and regeneration procedures.

18. The $CO_2$ adsorption and recovery method according to claim 14, wherein impurities in the inlet gas contain water vapor, volatile organic gas, nitrogen oxides, sulfur oxides, nitrogen or oxygen.

* * * * *